(12) United States Patent
Edwards et al.

(10) Patent No.: US 7,768,528 B1
(45) Date of Patent: Aug. 3, 2010

(54) REPLACEMENT OF FACES IN EXISTING VIDEO

(75) Inventors: Gareth Edwards, Macclesfield (GB); Kevin Walker, Sheffield (GB); Steven Caulkin, Cheshire (GB)

(73) Assignee: Image Metrics Limited (GB)

( * ) Notice: Subject to any disclaimer, the term of this patent is extended or adjusted under 35 U.S.C. 154(b) by 425 days.

(21) Appl. No.: 11/592,720

(22) Filed: Nov. 3, 2006

Related U.S. Application Data (60) Provisional application No. 60/735,035, filed on Nov. 9, 2005.

(51) Int. Cl.
G09G 5/36 (2006.01)
(52) U.S. Cl. .................................. 345/619; 345/473
(58) Field of Classification Search .................. 345/473, 345/619
See application file for complete search history.

(56) References Cited

U.S. PATENT DOCUMENTS

| | | | | |
|---|---|---|---|---|
| 4,276,570 A | * | 6/1981 | Burson et al. | 382/276 |
| 5,030,953 A | * | 7/1991 | Chiang | 341/172 |
| 5,774,591 A | * | 6/1998 | Black et al. | 382/236 |
| 5,818,954 A | * | 10/1998 | Tomono et al. | 382/115 |
| 6,072,496 A | * | 6/2000 | Guenter et al. | 345/419 |
| 6,154,559 A | * | 11/2000 | Beardsley | 382/103 |
| 6,163,322 A | * | 12/2000 | LaChapelle | 345/473 |
| 6,232,965 B1 | * | 5/2001 | Scott et al. | 715/203 |
| 6,353,679 B1 | * | 3/2002 | Cham et al. | 382/228 |
| 6,388,670 B2 | * | 5/2002 | Naka et al. | 345/474 |
| 6,560,284 B1 | * | 5/2003 | Girod et al. | 375/240.12 |
| 6,806,898 B1 | * | 10/2004 | Toyama et al. | 348/14.16 |
| 6,876,755 B1 | * | 4/2005 | Taylor et al. | 382/115 |
| 6,879,709 B2 | * | 4/2005 | Tian et al. | 382/118 |
| 6,919,892 B1 | * | 7/2005 | Cheiky et al. | 345/473 |
| 7,027,054 B1 | * | 4/2006 | Cheiky et al. | 345/473 |
| 7,079,580 B2 | * | 7/2006 | Sakaguchi | 375/240.16 |
| 7,120,880 B1 | * | 10/2006 | Dryer et al. | 715/863 |
| 7,324,110 B2 | * | 1/2008 | Edwards et al. | 345/473 |
| 2004/0135788 A1 | * | 7/2004 | Davidson et al. | 345/530 |
| 2007/0052698 A1 | * | 3/2007 | Funayama et al. | 345/419 |

OTHER PUBLICATIONS

Skeleton-based motion capture for robust reconstruction of human motion Herda, L.; Fua, P.; Plankers, R.; Boulic, R.; Thalmann, D.; Computer Animation 2000. Proceedings May 3-5, 2000 pp. 77-83.*

(Continued)

*Primary Examiner*—Javid A Amini
(74) *Attorney, Agent, or Firm*—Sunstein Kann Murphy & Timbers LLP (57) ABSTRACT

Methods and computer program code computer program codes for modifying an expression of an actor in at least one video frame based on performance of the actor in a sequence of frames of video footage. A plurality of control points are identified for characterizing the shape of the actor in each frame of the video footage by a shape vector comprising positions of the control points. The shape vectors of each frame are then warped to a common standard frame thereby generating an aligned shape vector and a transformed image for each frame. The aligned shape vectors and attendant texture vectors are transformed in accordance with specified pose and expression parameters to create new shape and texture vectors which are reinserted into the sequence of frames so as to reanimate the actor.

4 Claims, 8 Drawing Sheets

OTHER PUBLICATIONS

Extracting 3D facial animation parameters from multiview video clips, I-Chen Lin; Jeng-Sheng Yeh; Ming Ouhyoung; Computer Graphics and Applications, IEEE vol. 22, Issue 6, Nov.-Dec. 2002 pp. 72-80.*

A convex penalty method for optical human motion tracking, C. Barrón, I. A. Kakadiaris First ACM SIGMM international workshop on Video surveillance, Nov. 2003.*

Tracking a face for knowledge-based coding of videophone equences, Author: Liang Z.1 Source: Signal Processing: Image Communication, vol. 10, No. 1, Jul. 1997, pp. 93-114(22).*

Recognizing action units for facial expression analysis Tian, Y.-I.; Kanade, T.; Cohn, J.F.; Pattern Analysis and Machine Intelligence, IEEE Transactions on vol. 23, Issue 2, Feb. 2001 pp. 97-115 Digital Object Identifier 10.1109/34.908962.*

Active and dynamic information fusion for facial expression understanding from image sequences Yongmian Zhang; Qiang Ji; Pattern Analysis and Machine Intelligence, IEEE Transactions on vol. 27, Issue 5, May 2005 pp. 699-714 Digital Object Identifier 10.1109/TPAMI.2005.93.*

Bookstein, Fred L., "Principal Warps: Thin-Late Splines and the Decomposition of Deformations", *IEEE Transactions on Pattern Analysis and Machine Intelligence*, vol. 11, No. 6, Jun. 1989, pp. 567-585.

Wolfberg, George, "Image morphing: a survey", *The Visual Computer*, (1998) 14:360-372.

* cited by examiner

REPLACEMENT OF FACES IN EXISTING VIDEO

The present application claims the priority of U.S. Provisional Patent Application Ser. No. 60/735,035, filed Nov. 9, 2005, which application is incorporated by reference herein.

TECHNICAL FIELD

The invention relates generally to methods for changing existing video footage of an actor, and, more particularly, to methods for encoding the performance of the actor, as fixed in existing footage, in such a manner as subsequently to allow editing the expression of the actor's face independently of the pose of the face at a particular frame.

BACKGROUND ART

Vast quantities of recorded footage are in existence that show the face of one or more "actors." The term "actor," as used herein and in any appended claims, is used in the broadest sense to include traditional actors in TV, movies, etc., computer-graphics (CG)-generated characters, e.g. 'Shrek', and even individuals appearing in home videos etc. In fact, whenever a piece of footage exists with a face in it, human or otherwise, that face may be referred to herein as an "actor."

SUMMARY OF THE INVENTION

In accordance with preferred embodiments of the present invention, methods and computer program codes are provided for modifying an expression of an actor in at least one video frame based on performance of the actor in a sequence of frames of video footage. The method has steps, at least, of:

a. identifying a plurality of control points for characterizing the shape of the actor;

b. characterizing features of the actor in each frame of the video footage by a shape vector comprising positions of the control points;

c. warping shape vectors of each frame to a common standard frame thereby generating an aligned shape vector and a transformed image for each frame;

d. representing values of pixels of the transformed image as a texture vector;

e. transforming the aligned shape vector for each frame in accordance with specified pose and expression parameters to create new shape and texture vectors; and f. reinserting the new shape and texture vectors into the sequence of frames so as to reanimate the actor.

In accordance with various embodiments of the invention, the pose and expression parameters may cast as difference vectors with respect to a control expression.

In accordance with another aspect of the invention, a computer program product is provided for use on a computer system for modifying an expression of an actor in at least one video frame based on performance of the actor in a sequence of frames of video footage. The computer program product has a computer usable medium with computer readable program code thereon. The computer readable program code includes, at least, a. program code for identifying a plurality of control points for characterizing the shape of the actor;

b. program code for characterizing features of the actor in each frame of the video footage by a shape vector comprising positions of the control points;

c. program code for warping shape vectors of each frame to a common standard frame thereby generating an aligned shape vector and a transformed image for each frame;

d. program code for representing values of pixels of the transformed image as a texture vector;

e. program code for transforming the aligned shape vector for each frame in accordance with specified pose and expression parameters to create new shape and texture vectors; and f. program code for reinserting the new shape and texture vectors into the sequence of frames so as to reanimate the actor.

BRIEF DESCRIPTION OF THE DRAWINGS

The foregoing features of the invention will be more readily understood by reference to the following detailed description, taken with reference to the accompanying drawings, in which:

FIG. 4a shows the image of FIG. 3 warped to the reference frame, while

DETAILED DESCRIPTION OF SPECIFIC EMBODIMENTS

In accordance with preferred embodiments of the present invention, a process is provided whereby footage of an actor may be changed and replaced with new synthetic footage that is different from the original footage and yet convincing enough that a viewer, who had no other knowledge the replaced footage would appear realistic, as if it were original footage. For example, this technology would allow us to replace the phrase 'Frankly my dear, I don't give a damn', with the phrase, 'Ooh is that the time?', thereby producing a new piece of footage which is photo-realistic. This technology allows one to transfer a new performance onto an existing piece of acting.

In accordance with preferred embodiments of the invention, the shape of the actor (i.e., the position of particular pixels) undergoes a specified transformation so as to deform the footage in such a way as to make it appear to do something different than in the original scene. At the same time, the texture of the actor (i.e., the values of particular pixels) is also transformed, to make the pixel values take on plausible values for the new shape. So, for example, if the shape of the actor is changed to open the actors lips, the image texture must also be changed in order to show the presence (or otherwise) of teeth.

The steps involved in the aforesaid process include some or all of the following:

Step 1: Tracking and Aligning the Original Actor

Figure 1:
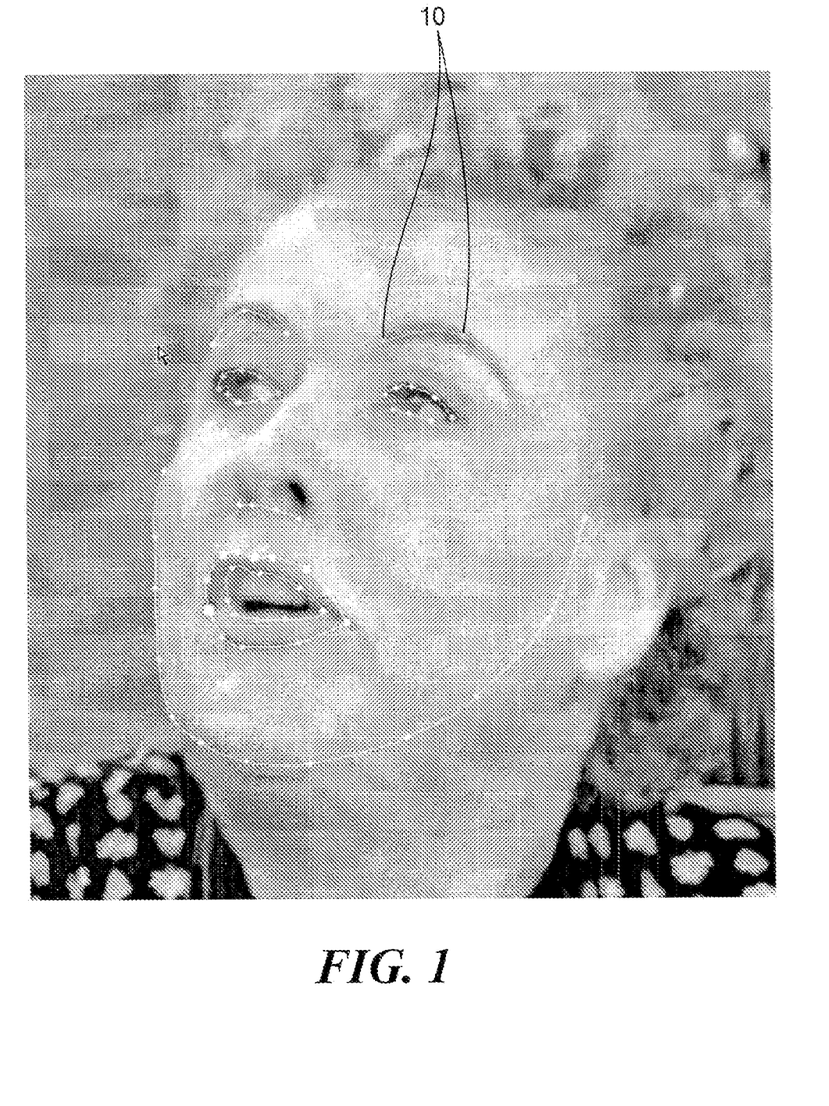
FIG. 1 depicts a typical set of key control points defined on the face of an actor for application of the invention.

The first step is the identification of key 'control points' on the original footage of the original actor that are used to characterize the shape of the actor. These are typical points on the lips, nose, eyes and facial boundary, though the specific choice of points depends on the type of movement that is being synthesized. A typical set of points 10 is shown in FIG. 1.

Key control points are typically located on every frame in the original footage. It is not important to the scope of the present invention how this location is achieved; alternative methods included manual placement of the points or automatic tracking methods such as those available in visual effects software packages such as "After Effects" by Adobe and "Flame" by Discreet.

The control points at each frame can be expressed as a shape vector, $$S=[x_1, x_2 \ldots x_n, y_1, y_2, \ldots, y_n],$$

where n is the number of control points, and each $x_i$, $y_i$ pair represents the location in two-dimensional (2-D) space of one of the indexed control points.

For most of the analysis described herein, calculations are performed that are independent of 2-D scale, rotation and position. To that end, every frame in the sequence is aligned to one frame of the sequence (the choice of frame is unimportant; typically the first frame of the sequence is chosen) using a standard 2-D alignment method such as Procrustes alignment, fully described in Goodall, *Procrustes Methods in the Statistical Analysis of Shape, J. Royal Statistical Soc.*, vol. 53(2), pp. 285-339 (1991), which is incorporated herein by reference.

Figure 2:
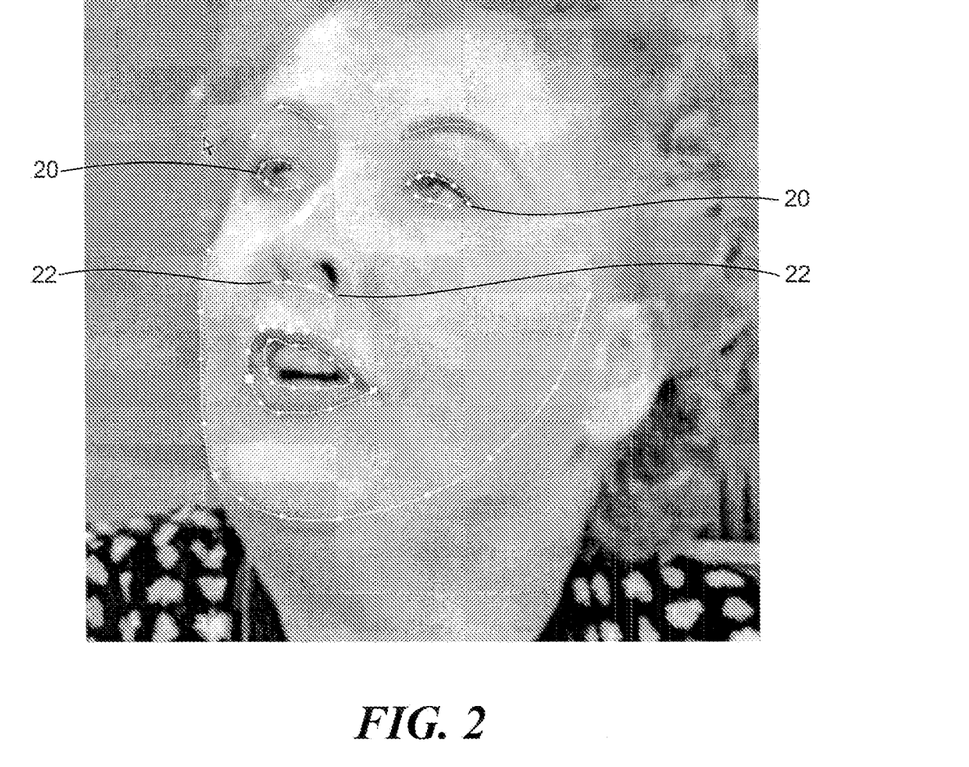
FIG. 2 shows points chosen for shape alignment in accordance with embodiments of the present invention.

The shape vector S at each frame is thus subjected to appropriate scaling, rotation and translation so that a chosen alignment subset of the points match as closely as possible the shape vector in the reference frame. The chosen subset must contain at least 3 points and these are typical points which can be regarded as almost rigid points on the face, for example, the corners of the eyes 20 and the corners of the nostrils 22 as shown in FIG. 2.

Each shape vector S is transformed to an aligned shape vector, P:

$$P = T*S,$$

where T is the appropriate transformation matrix computed in the Procrustes analysis.

Thus, in accordance with the alignment heretofore described, and unless specifically indicated otherwise, points referred to in the rest of this description are aligned points.

Step 2: Creating 'Shape-Free' Texture for Every Frame

In order to mathematically manipulate textures it is first necessary to construct a common frame of reference for textures so that for every frame in the sequence we can create a warped region of pixels with exactly the same number of pixels for each frame. The purpose of the warp is to provide that each warped pixel come from approximately the same physical location of the face in each frame.

There are many different ways of warping images to a common shape and the technique is routinely available in visual effects software. A review of techniques is provided by Wolberg, *Image Morphing: A Survey, The Visual Computer*, vol. 14(8/9), pp. 360-72, (1998), which review is incorporated herein by reference. Embodiments of the present invention typically employ the method of "thin-plate splines," described by Bookstein "Principal Warps: Thin-plate Splines and decomposition of Deformation," *IEEE Trans. Pattern Analysis and Machine Intelligence*, vol. 11, no 6, pp 567-85, (1989), which is incorporated herein by reference.

Figure 3:
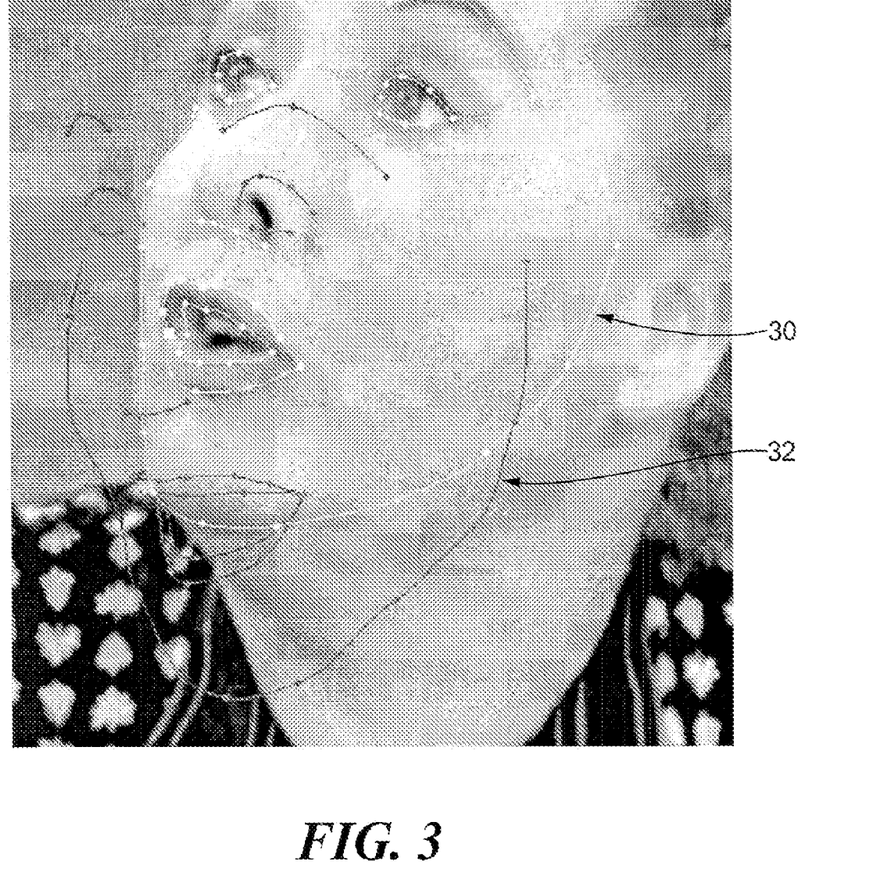
FIG. 3 shows an image overlayed with the actual shape vector and the shape vector for the reference frame.

FIG. 3 shows a typical frame from the sequence overlayed with both the actual shape vector 32 for that frame and the shape vector for the reference frame 34.

Figure 4A:
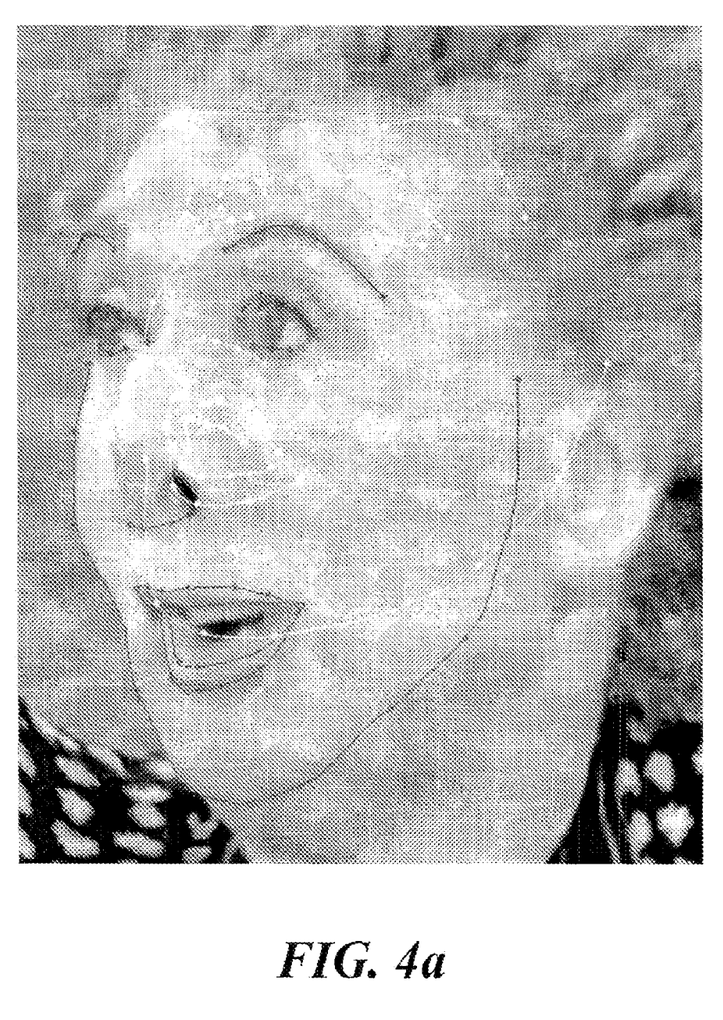
Figure 4B:
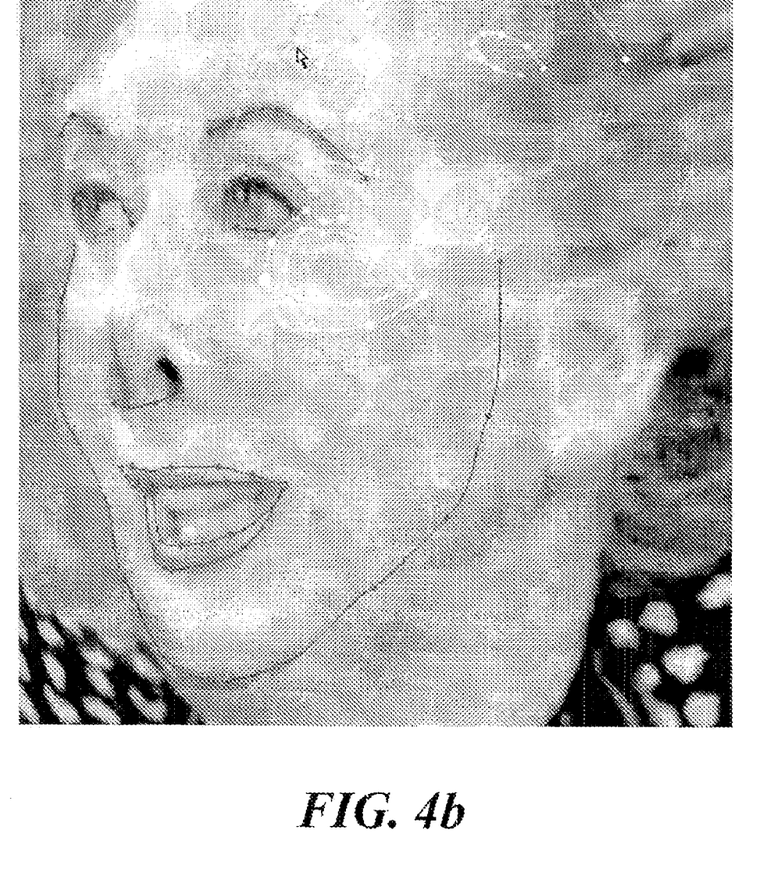
FIG. 4b shows an image from another frame of the sequence warped to the same reference frame.

After warping to the reference frame, the image of FIG. 3 is as shown in FIG. 4a, while the image of another frame of the initial sequence is as shown in FIG. 4b.

The choice of standard shape vector is arbitrary and, in one embodiment of the invention, the shape vector from one frame from the original footage may be selected as the standard shape vector.

Once every frame has been warped to a standard frame, thereby generating an aligned shape vector and a transformed image for each frame, the texture of each frame can be represented as a vector V, $$V=[r_1, r_2, \ldots r_p, g_1, g_2, \ldots g_p, b_1, b_2, \ldots b_p],$$

where p is the number of pixels in the region of interest, and r,g and b represent the red, green and blue values of corresponding pixels. In the case of grayscale images as shown above corresponding values of r g and b may well be equal, or have a fixed offset, or be handled in another manner known in the art, however, this is not important to the description of the invention. Grayscale and color images may be processed in exactly the same way.

Thus, to this point, for every frame in the sequence of frames, a Shape Vector, P, an alignment matrix T, and a Texture vector, V, have been generated.

It is to be understood that in typical embodiments of the invention, only a subset of elements of V may be of particular interest, such as those elements that represent pixels in the actor's face are of interest, so work can be performed with a smaller vector V', at each frame, where the elements of V' are a subset of the elements of V. The vector comprising elements of interest will be referred to herein as V, without loss of generality.

Step 3: Understanding Changes in the Actor

In the original footage, and any additional footage used for training, the target actor may show variation in both pose and expression. The term 'expression,' as used herein and in any appended claims, and unless dictated otherwise by context, means any deformation of the face, including a deformation due to speech. When the footage is reanimated, separate control of pose and expression is desirable. A mathematical model is first created that allows us to separate these two types of change in appearance. We do this by identifying a subset of the control points that we consider move independently of expression. These are specific to the actual face, but for example, we may say that a point on the bridge of the nose does not move due to change in expression, but only due to change in pose.

The aligned shape vector P is split into 2 separate (and mutually exclusive) vectors of points, $P_{pose}$ and $P_{exp}$ at each frame. Each element of P is assigned as either an general landmark (one who's movement depends on both expression and pose such as the corner of the mouth) or a pose landmark (one whose movement does not depend on expression). Two index vectors, G and F are created, where each contains a set of integers indicating the indices of P which belong to either the expression- or pose-subset of landmarks respectively. The total number of elements in G and F, together, is the same as the total number of elements in P.

$$P_{gen} = [x_{G(1)}, x_{G(2)} \ldots x_{G(Ne)}, y_{G(1)}, y_{E(2)}, \ldots, y_{G(Ne)}],$$

and $$P_{pose} = [x_{F(1)}, x_{F(2)} \ldots x_{F(Nf)}, y_{F(1)}, y_{F(2)}, \ldots, y_{F(Nf)}],$$

where Ne is number of expression landmarks and Nf is the number of pose landmarks.

We then identify r 'pose calibration' frames (where r is at least 2, but with no upper limit) in the original sequence (and in any additional training footage we may wish to use) where we consider the actor to have the same expression but a different pose. The choice of expression is arbitrary and could be a 'smile' or 'neutral', but it is called the 'control expression'. The pose calibration frames allow us to create a mathematical approximation for what the control expression would look like at any frame. The values of $P_{gen}$ and $P_{pose}$ at these r frames are used as training inputs to a learning algorithm that creates a model of the form:

$$P_{gen}(\text{control expression}) = \Phi_p(P_{pose})$$

There are many choices for the form of $\Phi_p$ but since the relationship is usually significantly non-linear in nature, Radial Basis Functions are a good choice. Radial basis functions are a set of functions, each characterized by symmetry in a plane about a selected point. Thus, the foregoing equations take the form:

$$P_{gen}(\text{control expression}) = A*D$$

where D is a vector of distances between the input $P_{pose}$ and the training examples $P_{pose}(t_1)$, $P_{pose}(t_2)$, etc.

$$D = [d(P_{pose}, P_{pose}(t_1)), d(P_{pose}, P_{pose}(t_2)), \ldots, d(P_{pose}, P_{pose}(t_r))];$$

The distance function d can take many forms but in most cases the simple Euclidean distance between the two vectors is effective. The matrix A is computed by simple multivariate linear regression, as described, for example, in Johnson et al., *Applied Multivariate Statistical Analysis*, Prentice Hall, (1998), which is incorporated herein by reference.

Furthermore, we learn a further texture prediction model which relates the points vectors P, to the textures vectors, V. We use every frame in the sequence to train a model of the form:

$$V = \Phi_v(P)$$

Once again there are many choices for the form of $\Phi_v$ but radial basis functions of exactly the same construction as for $\Phi_p$ are a good choice, again using a Euclidean distance function.

The foregoing method provides for taking any frame in the sequence (not just the training frames) and apply the function $\Phi_p$, to predict what the shape and texture of the control expression would have looked like had the actor be displaying the control expression at that particular frame:

$$P_{gen}(\text{control expression}) = \Phi_p(P_{pose})$$

$$V = \Phi_v(P')$$

where P' is the vector P who's elements G have been replaced by the values in $P_{gen}$.

Step 4: Manipulating the Appearance of the Actor

Since the 'control' appearance of the actor at any frame is now amenable to computation in accordance with the foregoing teachings, we can measure the difference between the control appearance and the actual appearance at each frame:

$$dP_f = P_f(\text{actual}) - P_f(\text{control expression}),$$

$$dV_f = V_f(\text{actual}) - V_f(\text{control}),$$

where f is a particular frame. We can choose a set of 'exemplar' frames, often chosen for particular phonemes or expressions which can be combined mathematically at a later time to create new shapes and textures. Thus we have a matrix of example difference vectors, dP and dV.

By choosing an appropriate weighted combination of these difference vectors we can create a new appearance by constructing a new pair of shape and texture vectors:

$$P(\text{new}) = P(\text{control}) + w*dP$$

$$V(\text{new}) = V(\text{control}) + w*dV$$

where w is a vector of weights with the same number of elements as there are exemplar frames chosen.

Reanimating the face is then performed by choosing suitable values for weight w at each frame. There exist many techniques for choosing the values for w, including keyframing and automatic retargeting from another actors performance, as taught in U.S. Provisional Application 60/634,488, filed Dec. 9, 2004, which is incorporated herein by reference.

The manipulated shape and texture, P(new) and V(new) are then reinserted into the original image. The reanimated actor's face will almost certainly have a bounding shape (enclosing the whole face) at most frames that is different from the bounding shape in the original. Therefore, the face may be composited into the scene within the scope of the present invention, using any of a variety of commonly available compositing tools.

The chosen alignment subset of points are used to compute, using Procrustes Analysis, the transform matrix, T', to best map P(new) onto $P_f$ where $P_f$ is the vector of control points for the target frame.

$$S_f(\text{new}) = T'*P(\text{new})$$

Figure 5:
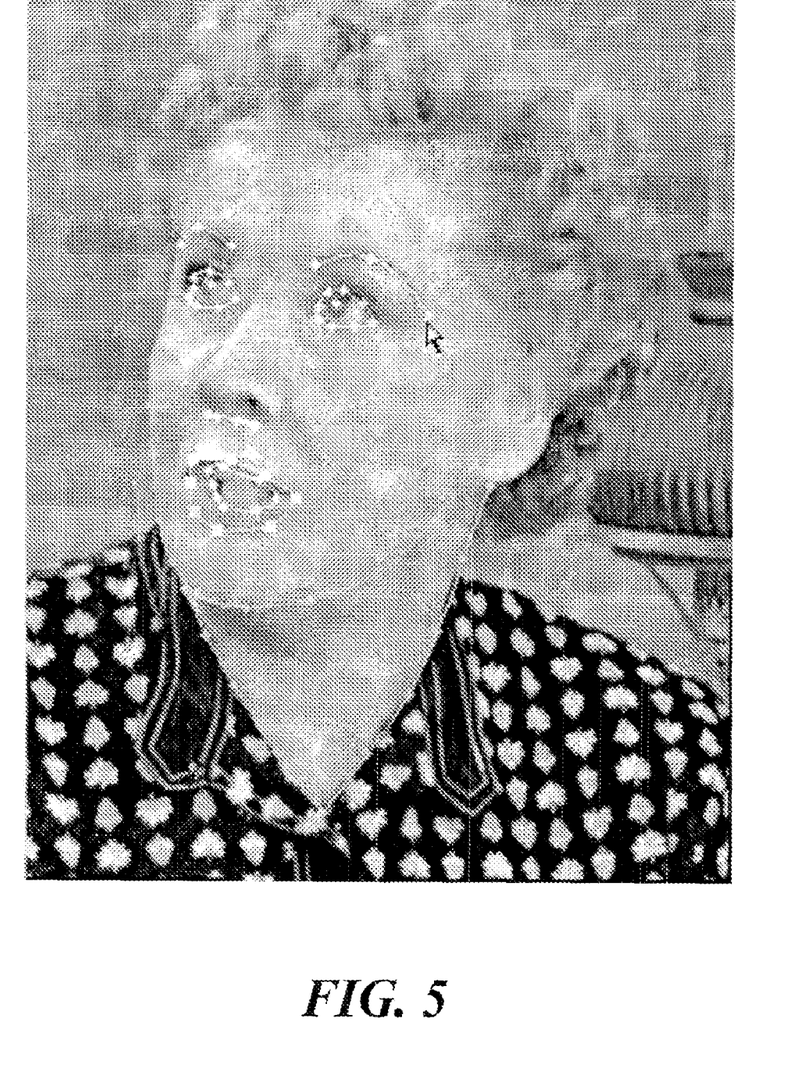
FIG. 5 shows an image of the original sequence overlayed with the actual shape vector.
Figure 6:
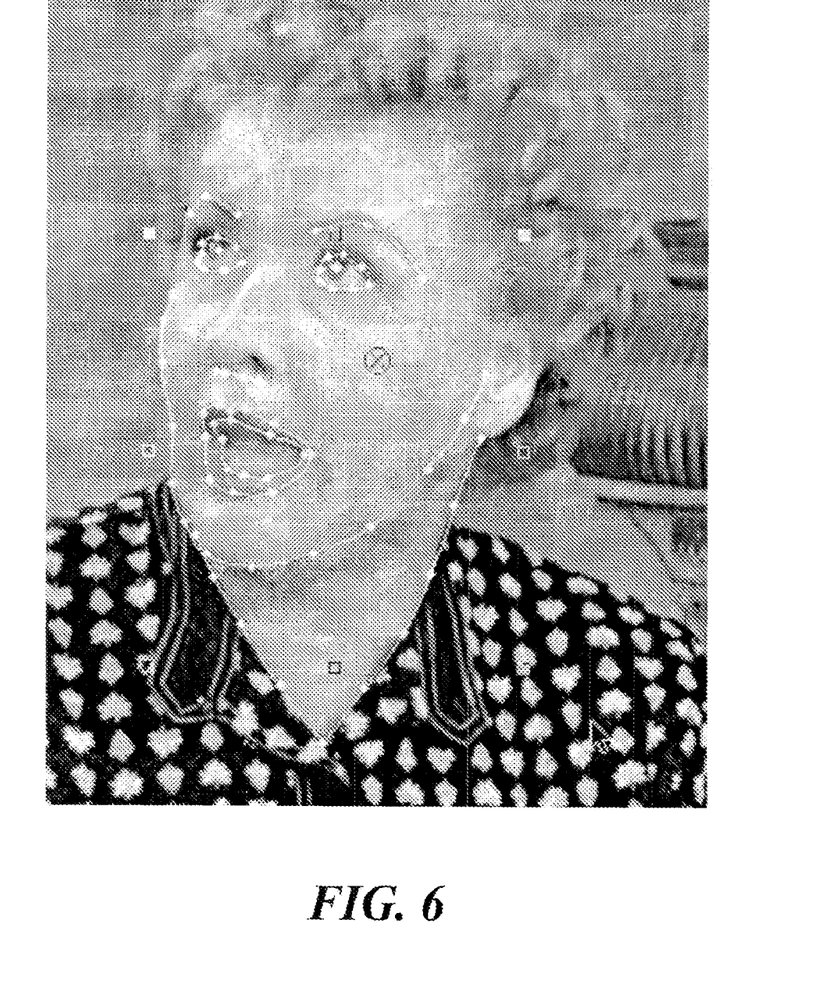
FIG. 6 shows the frame of FIG. 5 in which the expression of the actor has been modified employing a method in accordance with an embodiment of the present invention.
Figure 7:
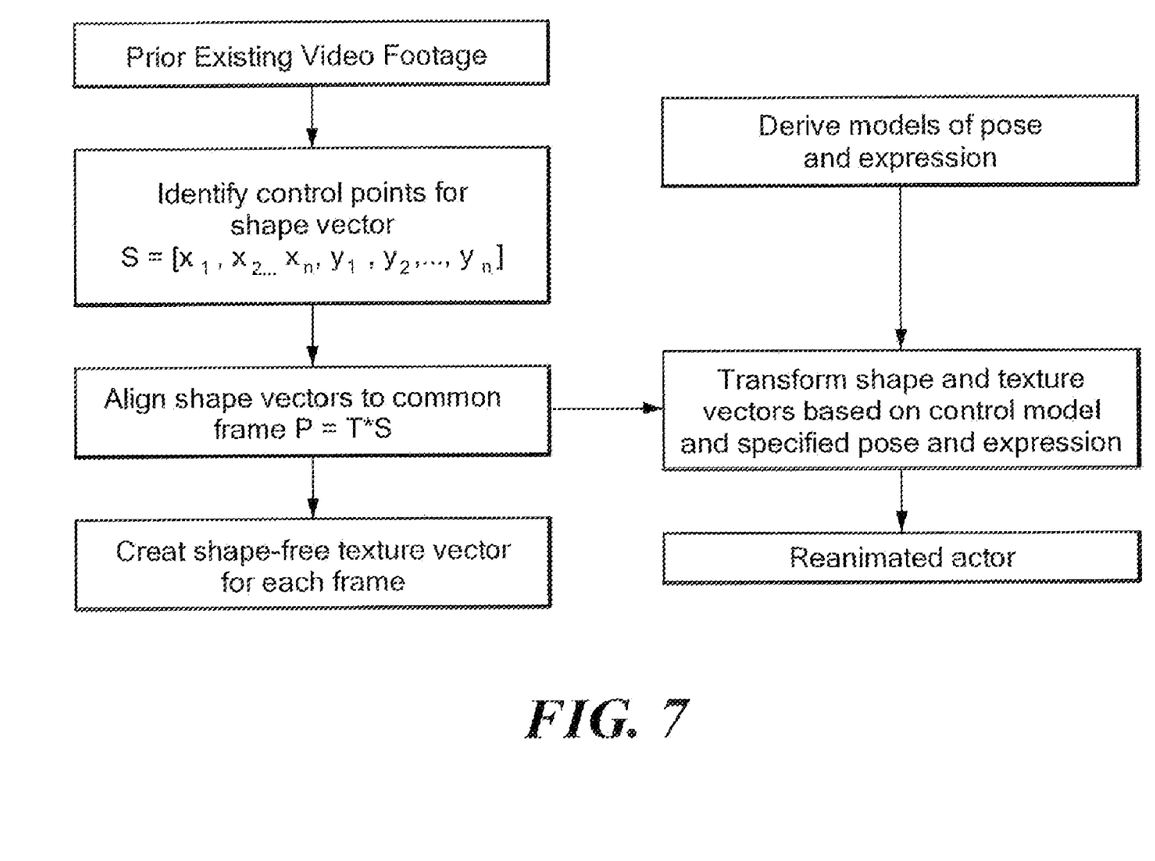
FIG. 7 is a flow chart depicting an application of preferred embodiments of the invention to derive and apply expression control values for modifying the expression of an actor's face in existing footage.

Finally V(new) is warped using exactly the same techniques, e.g. thin plate splines, to the new shape $S_f$(new). Thus the original image, shown, for example, in FIG. 5 is changed. FIG. 6 shows the result of the process described above on the frame of video footage shown in FIG. 5 so as to show an appearance of an open mouth.

The described embodiments of methods for modifying an expression of an actor in existing video footage are implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. For example, the video stream need not be of 'real-life' footage; exactly the same methods describe may also be applied in a circumstance wherein an existing animation is used as the video stream and it is applied animate a new character. All such variations and modifications are intended to be within the scope of the present invention as defined in the appended claims.

What is claimed is:

1. A modification method for modifying an expression of an individual in at least one video frame, said modification method being based on a model of the individual derived from a plurality of video frames of video footage, while a pose of the individual's performance that is associated with each video frame is retained, the individual being characterized by a shape, the method comprising:
   a. identifying a plurality of control points with respect to the individual for characterizing the shape of the individual;
   b. characterizing at least one feature of the individual in each frame of the video footage by a shape vector, the shape vector comprising x and y image coordinate positions of the plurality of control points;
   c. warping each shape vector of each frame to a common standard frame thereby generating an aligned shape vector and a transformed image for each frame;
   d. representing values of pixels of the transformed image as a texture vector;
   e. specifying a subset of the plurality of control points as belonging to a group of pose control points;
   f. creating a first model to predict a control expression shape vector from the group of pose control points;
   g. creating a further model to predict a texture vector from the plurality of control points;
   h. extracting a set of exemplar frames from among the plurality of video frames of video footage to serve as a basis for expression manipulation;
   i. representing each frame of the basis for expression manipulation as a difference between observed shape and texture vectors and the control expression shape and texture vectors predicted in steps (f) and (g) from the plurality of control points;
   j. transforming each shape vector for each frame in accordance with specified pose control points and weights applied to the said basis for expression manipulation in such a manner as to create new shape and new texture vectors; and
   k. reinserting the new shape and new texture vectors into the sequence of frames so as to create a graphical depiction of the individual bearing a modified expression.

2. A method in accordance with claim 1, wherein pose and expression parameters are cast as difference vectors with respect to the plurality of control points.

3. A memory device readable by a machine, tangibly embodying a program of instructions executable by the machine to perform a method for modifying an expression of an individual displayed in an original image in a plurality of video frames from a sequence of frames of a video footage based on original images of the individual displayed in the sequence of frames, the method comprising:
   a. identifying a plurality of control points with respect to the individual for characterizing the shape of the individual;
   b. characterizing at least one feature of the actor in each frame of the video footage by a shape vector, the shape vector comprising x and y image coordinate positions of the plurality of control points;
   c. warping each shape vector of each frame to a common standard frame thereby generating an aligned shape vector and a transformed image for each frame;
   d. representing values of pixels of the transformed image as a texture vector;
   e. specifying a subset of the plurality of control points as belonging to a group of pose control points;
   f. creating a first model to predict a control expression shape vector from the group of pose control points;
   g. creating a further model to predict a texture vector from the plurality of control points;
   h. extracting a set of exemplar frames from among the plurality of video frames of video footage to serve as a basis for expression manipulation;
   i. representing each frame of the basis for expression manipulation as a difference between observed shape and texture vectors and the control expression shape and texture vectors predicted in steps (f) and (g) from the plurality of control points;
   j. transforming each shape vector for each frame in accordance with specified pose control points and weights applied to the said basis for expression manipulation in such a manner as to create new shape and new texture vectors; and
   k. reinserting the new shape and new texture vectors into the sequence of frames so as to create a graphical depiction of the individual bearing a modified expression.

4. A computer program product for use on a computer system for modifying an expression of an individual displayed in an original image in a plurality of video frames from a sequence of frames of a video footage based on original images of the individual displayed in the sequence of frames, the computer program product comprising a computer usable tangible storage medium having computer readable program code thereon, the computer readable program code comprising:
   a. program code for identifying a plurality of control points with respect to the individual for characterizing the shape of the individual;
   b. program code for characterizing at least one feature of the individual in each frame of the video footage by a shape vector, the shape vector comprising x and y image coordinate positions of the plurality of control points;
   c. program code for warping each shape vector of each frame to a common standard frame thereby generating an aligned shape vector and a transformed image for each frame;
   d. program code for representing values of pixels of the transformed image as a texture vector;

e. program code for specifying a subset of the plurality of control points as belonging to a group of pose control points;
f. program code for creating a first model to predict a control expression shape vector from the group of "pose" control points;
g. program code for creating a further model to predict a texture vector from the plurality of control points;
h. program code for extracting a set of exemplar frames from among the plurality of video frames of video footage to serve as a basis for expression manipulation;
i. program code for representing each frame of the basis for expression manipulation as a difference between observed shape and texture vectors and the control expression shape and texture vectors predicted in steps (f) and (g) from the plurality of control points;
j. program code for transforming each shape vector for each frame in accordance with specified pose control points and weights applied to the said basis for expression manipulation in such a manner as to create new shape and new texture vectors; and
k. program code for reinserting the new shape and new texture vectors into the sequence of frames so as to create a graphical depiction of the individual bearing a modified expression.

* * * * *